United States Patent [19]

Angelety, Sr.

[11] Patent Number: 4,679,346
[45] Date of Patent: Jul. 14, 1987

[54] FISHING APPARATUS

[76] Inventor: Albert Angelety, Sr., 2512½ Pauger St., New Orleans, La. 70116

[21] Appl. No.: 764,548

[22] Filed: Aug. 12, 1985

[51] Int. Cl.$^4$ .............................................. A01K 89/00
[52] U.S. Cl. ......................................... 43/20; 43/27.4; 242/84.1 R; 254/366
[58] Field of Search ............... 242/217, 218, 220, 219; 43/21.2, 20, 27.4; 254/366

[56] References Cited

U.S. PATENT DOCUMENTS

| | | | |
|---|---|---|---|
| 522,503 | 7/1894 | De Bem | 43/27.4 |
| 2,030,875 | 2/1936 | Johnson | 43/15 |
| 2,661,563 | 12/1953 | Adams | 43/21.2 |
| 2,664,661 | 1/1954 | Kohn | 43/21.2 |
| 2,792,658 | 5/1957 | Stafford | 43/21.2 |
| 3,844,058 | 9/1974 | King | 43/27.4 |

*Primary Examiner*—Nicholas P. Godici
*Assistant Examiner*—Karen Skillman
*Attorney, Agent, or Firm*—Pravel, Gambrell, Hewitt & Kimball

[57] ABSTRACT

A fishing apparatus having a main frame comprising of a center post having a sprocket wheel rotatably mounted on its upper end. There is further provided a frame extending from the center post for housing a second sprocket wheel, the two sprockets interconnected via a continuous link chain, so that rotation imparted onto the main sprocket imparts rotation to the secondary sprocket. The secondary sprocket is rotated in unison to a reel member housing a quantity of fishing line to be reeled in and out depending on rotation of the sprocket wheel. There is further provided a braking frictionally braking to the reel upon movement of the chain in a certain direction. Likewise, upon slight movement of the chain in the second direction the secondary sprocket wheel becomes a free rolling wheel and will allow a line to be reel therefrom. Further, one of the handle members attached to the main sprocket is weighted so that upon it being positioned within a certain arc around its rotation axis, it will, by gravity, move the secondary sprocket wheel into a locked positioned so that the secondary wheel is automatically locked. The apparatus further provides a handle for pivoting the main frame around in 365 degrees for use with the apparatus.

10 Claims, 3 Drawing Figures

FISHING APPARATUS

FIELD OF THE INVENTION

The present invention relates to the apparatus for fishing. More particularly, the present invention relates to an appratus for undertaking deephole fishing utilizing a chain and sprocket system which incorporates automatic braking and easy reeling of any fish caught on the line.

BACKGROUND OF THE INVENTION

In the area of fishing, there is a constant endeavor to design an apparatus whereby fish may be caught and reeled in at a faster pace and with less stress on the fisherman. Of course, the most standardized type of fishing equipment is the rod and reel apparatus which is well known in the art is a hand cranked reel mounted on the end of a flexible fishing pole, wherein there is a direct link between the hand reel and the taking in of the line. For a large fish or for a number of fish on various hooks on the line, it becomes very difficult to reel in the catch at certain times. Therefore, apparently in an effort to address the problem of multiple fishing lures or quite larger fish, several apparatuses have been patented which suggest an attempt to solve that problem. The most pertinent are as follows:

U.S. Pat. No. 2,792,658 issued to Stafford entitled "Fishing Apparatus", teaches the use of the double sprocket interconnected via a chain mounted on a main central post wherein there is provided a flexing member with a pully spool on the end, wherein a line is reeled via the hand cranking of one sprocket onto the second sprocket via the end of the flexible line. The system also addresses the use of the bake mechanism for braking the turning of the sprocket or the line reel during reeling of the fish.

U.S. Pat. No. 2,664,661 issued to Kohn entitled "Fishing Apparatus", also teaches the use of a flexible pole housing a line which is reeled onto a sprocket wheel, with the apparatus mounted on a base member. There is a use of a sprocket wheel for eliminating any danger of reeling out of the line should the handle slip from the hand.

U.S. Pat. No. 3,844,058 issued to King entitled "Down-Rigger Reel", teaches the use of an apparatus having a principal reeling reel or drum operated with two handles extending therefrom from a flexible shaft. The reel is particularly adapted for down-rigger fishing as in trawling, and discusses the convenience of such construction.

U.S. Pat. No. 2,030,875 issued to A. Johnson entitled "Fishing Apparatus", relates to a hand crank apparatus fishing reel which is mountable on a shaft whereby a pully wheel is hung from one end of an extender rod for dropping the line into the water.

U.S. Pat. No. 522,503 issued to DeBem entitled "Fisherman's Reel", teaches the use of a sprocket reel mounted on a axle with a handle for maneuvering the line onto or out of the reel. The apparatus is particularly suitable for mounting on the edge of a boat or the like, and has no fishing rod attached thereto.

SUMMARY OF THE PRESENT INVENTION

The apparatus of the present invention relates to an improvement in the art of fishing apparatus. What is provided is a fishing apparatus having a main frame comprising of a center post having a sprocket wheel rotatably mounted on its upper end. There is further provided a frame extending from the center post for housing a second sprocket wheel, the two sprockets interconnected via a continuous link chain, so that rotation inparted onto the main sprocket imparts rotation to the secondary sprocket. The secondary sprocket is rotated in unison to a reel member housing a quantity of fishing line to be reeled in and out depending on rotation of the sprocket wheel. There is further provided a breaking mechanism within the secondary sprocket reel for providing frictionally breaking to the reel upon movement of the chain in a certain direction. Likewise, upon slight movement of the chain in the second direction the secondary sprocket wheel becomes a free rolling wheel and will allow a line to be reel therefrom. Further, one of the handle members attached to the main sprocket is weighted so that upon it being positioned within a certain arc around its rotation axis, it will, by gravity, move the secondary sprocket wheel into a locked positioned so that the secondary wheel is automatically locked. The apparatus further provides a handle for pivoting the main frame around in 365 degrees for use with the apparatus.

Therefore, it is an object of the present invention to provide a fishing apparatus operatable through end reeling of a main sprocket interconnected to a secondary sprocket;

It is a further object of the present invention to provide a fishing apparatus whereby movement of the main sprocket imparts, through chain interconnection, or through linked chain interconnection, movement of the second sprocket to place the second sprocket either in the locked position or in the free reeling position;

It is a further object of the present invention to provide a fishing apparatus, having at least one weighted crank handle so that positioning of the crank handle will provide for automatic breaking of the apparatus during use.

BRIEF DESCRIPTION OF THE DRAWINGS

A better understanding of the invention can be had when the detailed description of a preferred embodiment set forth below is considered in conjunction with the drawings, in which.

DETAILED DESCRIPTION OF THE PREFERRED EMBODIMENT

Figure 1:
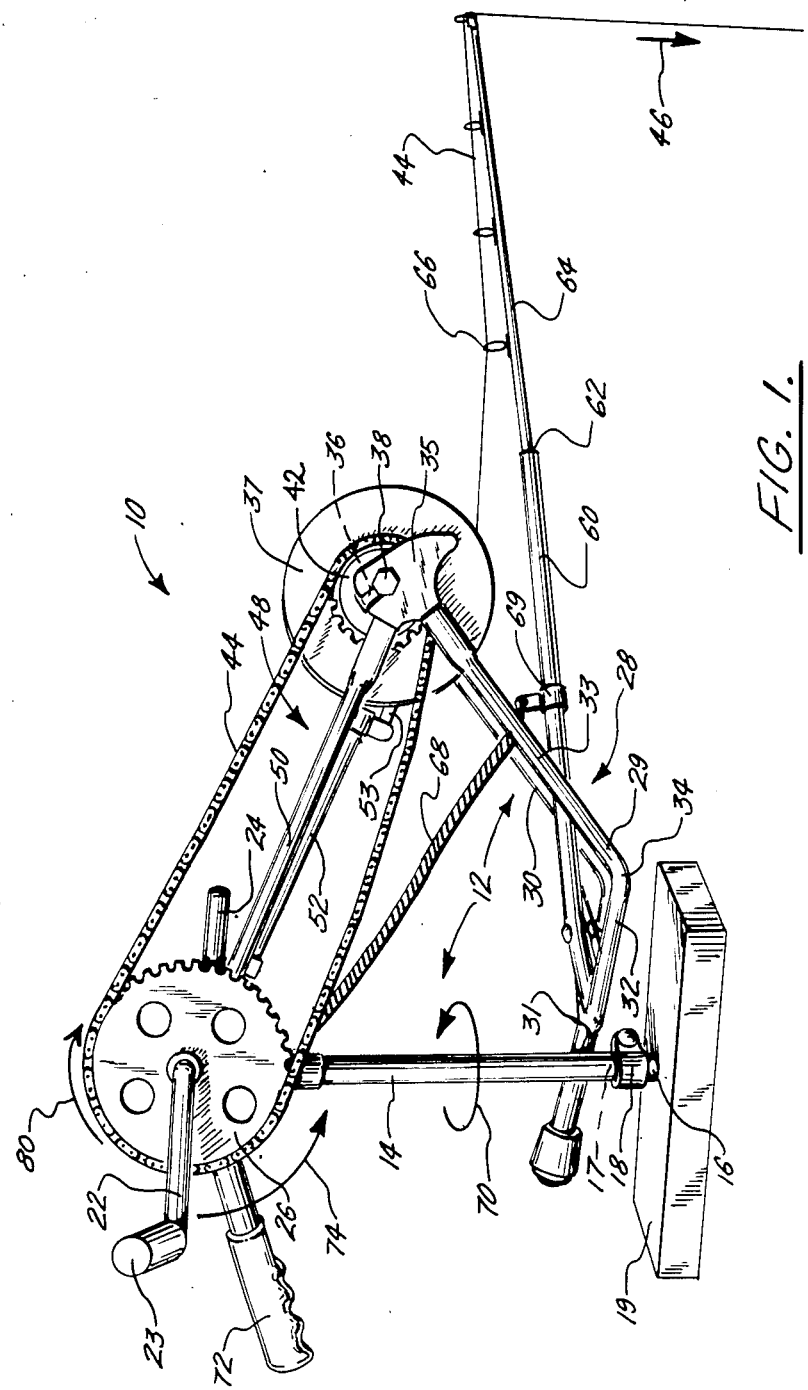
FIG. 1 is a side view of the preferred embodiment of the apparatus of the present invention.

The apparatus of the preferred embodiment of the present invention is illustrated by the numerial 10. As seen, particularly in FIG. 1, apparatus 10 would include a general mounting frame 12 which would comprise a generally vertically inclined main mounting post 14 which, in the preferred embodiment, would have a lower end 16 which would be generally a hollow tube for insertion of a stationary mounting insert 17, there into not seen in the drawings. Preferably the insert 17 would be slipped into the lower end 16 of post 14 with a mounting bracket 18 secured to frictionally engage the frame 12 via mounting post 14 onto mounting insert 17. In the drawings, rectangular platform 19 represents the bow of the boat or other stable structure that insert 17 would project therefrom. Also, depending on the length of mounting insert 17, the height of the apparatus can be adjusted to accommodate fishing while seated or standing. Rigidly attached to the upper end of main mounting post 14 would be cylindrical housing 20, which could be a typical housing for bicycle pedals that is constructed with a continuous horizontal axle therethrough. The axle would be mounted within a pair of bearing races within housing 20, and, handles 22 and 24 would project from the axle for easy rotation. Handles 23 and 24 could be interchanged in a mounting bolts 25 to accommodate predominatly left or right handed fishermen. There would be provided a principal sprocket 26, adjacent handle 22 for rotation axle so that axle is rotated within housing 20. Housing 20 is equiped with grease fitting 21 in order to maintain the axle well lubricated during use. Main sprocket 26 is so mounted as to rotate in unison with handles 22 and 24 during use of the apparatus. Frame 12 further comprises a lower extender frame section 28 which would generally comprise a pair of frame arms 29 and 30 rigidly secured through welding or the like to the lower portion of vertical main mounting post 14 at point 31. Frame arms 29 and 30 generally include a first arm section 32 extending substantially horizontally from post 14, with a second arm section 33 bent and protruding at point 34 to conclude at a sprocket housing portion 35 which includes a slot 36 for slottingly engaging the end of sprocket axle 38 therethrough. In the preferred embodiment, frame arms 29 and 30 would be spaced apart so as to accommodate secondary sprocket 40 and reel 37 rotatably mounted on axle 38, with axle 38 slottingly accommodated into slot 36 on each of arm members 29 and 30, and secured via a bolt 39 or the like. As seen in the drawings, reel 37 would be a spool reel housing a continuous fishing line 41 along a central hub portion of reel 37, not seen in the drawings, Therefore, as seen in the drawings, rotation of main sprocket 26 via handles 22 and 24 in a certain direction, would impart rotation to secondary sprocket 42 via continuous linked chain 44. In the preferred embodiment, when secondary sprocket 42 is rotated in at least one direction, it would likewise impart rotation to reel 37, during operation of the apparatus, via link chain 44.

For further support to the mounting of reel 37 and secondary sprocket 42, there is provided a second pair of upper frame arms 50 and 52 which in the preferred embodiment would be rigidly mounted on their first end via welding or the like to cylindrical housing 20, and would be spaced apart as are arms 29 and 30, to be also rigidly attached on their second end to bracket 35, so that mounting bracket 35 is securely held in place via the combination of the lower frame section 28 and the upper frame section 48 as seen in the drawings.

In the preferred embodiment, spool 37 would have an internal axle configuration of the rear wheel of a typical bicycle, i.e. accommodating a braking mechanism therein, such as of the morel type, including a fixed axle shaft having a brake anchor member 53 mounted thereupon. As is a typical braking morel type mechanism, the secondary sprocket when turned in one direction via linked chain 44 would in part rotatation to reel member 37. However, when turned in the second direction due to braking bracket 53, spool 37 would be locked in the braking position and would be held in place until sprocket 42 is "backed off", from the locked position via slight rotation of linked chain 44, and therefore, spool reel 37 would be free reeling in that it would be able to rotate freely until such time as either it would be brought into rotation in one direction via the rotation of the main sprocket 26 or would be braked by a rotating linked chain 44 in the opposite direction. In addition, in the event a large fish were to be hooked the brake mechanism can be utilizied as a clutch means for creating drag on reel member 37 by placement of slight back pressure on sprocket 42 in a chain 44, thus slightly dragging the rotation of reel 37 and unreeling of line 41.

Figure 2:
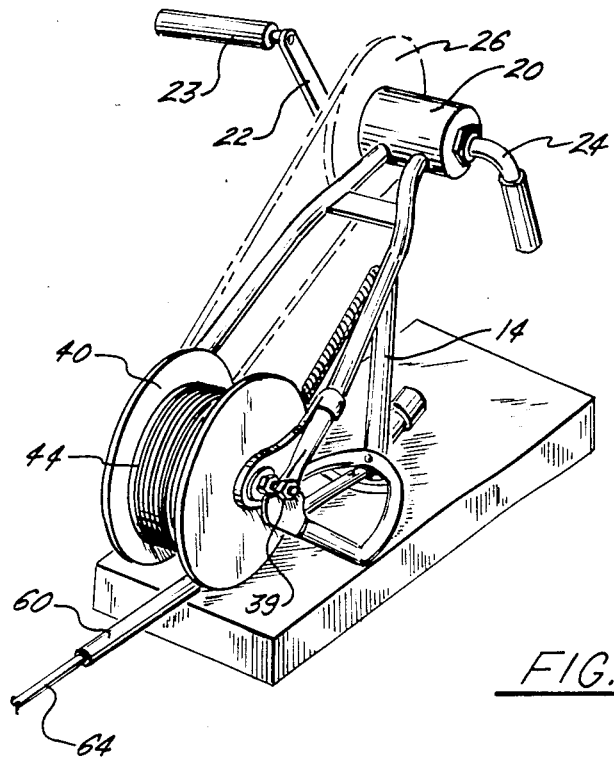
FIG. 2 is an overall perspective view of the perferred embodiment of the apparatus of the present invention illustrating particularly the reel and sprocket mechanism.
Figure 3:
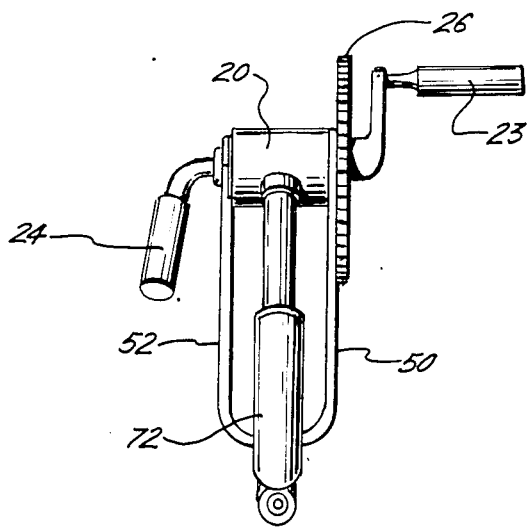
FIG. 3 is a top rear view of the handle reeling portion of the apparatus of the present invention.

The mechanism heretofore discussed makes little or no reference to it being utilizied as a fishing apparatus. This configuration as a fishing apparatus shall be discussed at this point. As seen in FIGS. 1 and 2, also rigidly attached to the lower end of main mounting post 14 would be a flexible fishing means 60 which would comprise a rigid and secure pole mounting frame 61 opened ended at point 62 for frictionally engaging a fishing pole 64 thereinto during fishing. Fishing pole 64 would be a typical pole having a plurality of threaded eyelets 66 for threading the fishing line 41 therethrough which would ultimately be dropped into the water in the direction of ARROW 46.

Line 41, as was discussed earlier, would be reeled from spool 37 and would be a continuous line which could be of various lengths depending upon the amount of line contained on spool 37.

Apparatus 10 would further comprise a means for supporting pole mounting frame 61 in addition to its rigid welding onto post 14. This means would further comprise a spring 68 extending between the midpoint 69 of pole mounting frame 61 and the upper portion of main mounting post 14. This spring 68 would provide that when stress is put upon cord 41, rather than pole 64 secured in place only via the rigid attachment to post 14, spring 68 serves as a secondary means of relieving the stress upon pole 60, during the use of the apparatus.

Structurally, apparatus 10 as was stated earlier, would be mounted onto a mounting insert 17 which would be engaged into main post 14, and secured by bracket 18. However, this frictional engagement would allow 360 degree rotation of apparatus 10 as seen via ARROW 70 during use, and this rotation could be accommplished easily via the upper handle means 72 which could be manually grasped and rotated in either direction to inpart rotation to the apparatus. Of course, should one wish to secure the apparatus, a simple tightening of mounting bracket 18 would ensure that apparatus 10 would be frictionally engaged or secured to insert 17 and a minimal of swivel could occur.

Apparatus 10 would further comprise a means for automatically placing secondary sprocket 42 in the brake position during use of the apparatus. As seen in the drawings, apparatus 10 has upper handles 22 and 24, one of the handles 22 having a main grasping portion 23 which extrudes 90 degrees out from handle arm of the handle 22. In addition to serving as a means for grasping handle 22, grasping portion 23 also contains a means for automatically placing the sprocket 26 in the brake position. This means comprises an internal weight structure which would make handle 22 heavier than handle 24. Therefore, when handle 22 is placed in the position on the rear half of the revolution as seen in FIG. 1, it would tend to move downward as seen via ARROW 74, and chain 44 would automatically impart rearward movement to secondary sprocket 42 and thus place spool 37 in the braked position. Therefore, should one wish to leave apparatus 10 for a second, one could simply place the handle 23 in the position as seen in FIG. 1, and it would be automatically braked should spool 37 attempt to reel outward because of the bite of a fish or the like.

It should be noted that in operation, apparatus 10 would enable one to stand adjacent handle 72 and by imparting slight forward movement to linked chain 44 as seen by ARROW 80, sprocket 42 would be placed in the non-braking or free reeling mode, and therefore, spool 37 would tend to unreel depending upon the weight at the end of line 41. That would be the proper mode for moving the bait down into the water to a certain depth. Upon the movement of linked chain 44 in the direction of ARROW 74, sprocket 42 would be moved into the braking position, and spool 37 would be brakingly secured for non movement. This would be the case if one wishes to stop reeling with the apparatus.

Because of the weight of handle 23, if handle 23 is in the position as seen in FIG. 1, it would maintain itself in the braking position due to the weight of the handle. However, a slight movement of linked chain 44 in the direction of ARROW 80 would again impart free reeling motion to sprocket 42, and again could unreel. However, when one would be ready to reel in the fish or the like, handle 23 and 24 would be continuously moved in the direction of ARROW 80 and reel 37 would likewise respond to reel in line 44 to the desired depth.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. An improved fishing apparatus, comprising:
   a. a frame;
   b. a primary sprocket rotatably on the frame, the primary sprocket further including a pair of handle members for manually imparting rotation to the primary sprocket;
   c. a spool containing fishing line rotatably mounted on the frame;
   d. means for interconnecting the sprocket and the spool so that rotation of the sprocket imparts rotation to the spool;
   e. a flexible pole member mounted on the frame for housing a length of fishing line from the rotatably mounted spool; and
   f. braking actuating means, housed within one of the handle members so that positioning of the handle within a certain arc around its rotational axis provides frictional non-rotation of the spool and the spool member when a pull is exerted at the end of the length of fishing line.

2. The apparatus in claim 1, wherein the apparatus is mounted onto the frame of a boat or the like.

3. The apparatus in claim 1, wherein said braking actuating means further includes a member for providing greater weight to the handle wherein it is housed so that gravity would impart a downward rotation to the weighted member for initiating the braking action.

4. The application in claim 1, wherein a portion of the flexible pole member is frictionally engaged and removable from a pole member housing.

5. An improved fishing apparatus comprising:
   a. a main frame having a primary sprocket and a secondary sprocket, with the primary and secondary sprockets interconnected via a continuous chain;
   b. a fishing line spool adjacent the secondary sprocket for rotating in unison with the rotation of the secondary sprocket;
   c. handle members attached to the primary sprocket for manually imparting rotation to the primary sprocket;
   d. a pole member extruding from the frame for receiving line from the spool member, the pole extending outward from a pole bracket mounted on the frame; and
   e. automatic brake actuating means including a weighted member housed within one of the handle members so that positioning of the handle member within a certain arc around its rotational axis provides frictional non-rotation of the spool and the spool member.

6. The apparatus in claim 5, wherein the spool member is a free reeling spool when the secondary sprocket is placed in a certain position.

7. The apparatus in claim 6, further providing spring means interconnecting the pole mounting base and the frame for providing additional support to the pole during fishing.

8. An improved fishing apparatus, comprising:
   a. a frame including a primary sprocket and a secondary sprocket, the primary and secondary sprockets interconnected via a continuous chain;
   b. a fishing line spool adjacent the secondary sprocket for rotating in unison with the rotation of the secondary sprocket;
   c. means secured to the primary sprocket for manually imparting rotation to the primary sprocket;
   d. a pole member extending outward from the frame for receiving line from the fishing line spool;
   e. means for imparting frictional rotation to the fishing line spool when back pressure is placed on the primary sprocket and continuous chain so that drag will be effective when a fish is pulling the fishing line, said means including a weighted member housed within one of the handle members so that positioning of the handle member within a certain arc around its rotational axis provides frictional non-rotation of the spool and the spool member, when a pull occurs on the end of the line.

9. The apparatus in claim 8, wherein the spool member is a free reeling spool when the secondary sprocket is placed in a position to impart no force on the spool member.

10. The apparatus in claim 8, further providing spring means inter-connecting the pole mounting base in the frame for providing additional support to the pole during fishing.

* * * * *